Patented May 2, 1933

1,906,426

UNITED STATES PATENT OFFICE

WALDO L. SEMON, OF CUYAHOGA FALLS, OHIO, ASSIGNOR TO THE B. F. GOODRICH COMPANY, OF NEW YORK, N. Y., A CORPORATION OF NEW YORK

BRUSH AND METHOD OF MAKING THE SAME

No Drawing.    Application filed February 1, 1930. Serial No. 425,352.

This invention relates to the art of making brushes, and particularly those brushes in which the bristles are set in a binder of rubber.

Heretofore brushes have commonly been made by dipping the butt end of a knot of bristles in a rubber cement, evaporating at least the major portion of the solvent, compacting the bristles, and vulcanizing the rubber, preferably to a hard rubber. This method has a number of inherent disadvantages and shortcomings which have been a source of considerable annoyance to the trade, in spite of the undisputed merits of the brushes in which the bristles are bound in rubber. The rubber cements must of necessity be sufficiently fluid to penetrate the mass of bristles readily, but when diluted to the extent necessary to have low viscosity they contain only very small proportions of rubber. There is consequently some difficulty in introducing a sufficient amount of rubber into the mass of bristles to bind it together properly. A further defect of the cements has been that it is practically impossible to make a satisfactory cement containing scrap or reclaimed rubber, so that the cements of necessity contain only the much more expensive raw rubber dissolved in a considerable volume of an expensive volatile solvent which is irretrievably lost by evaporation during the course of manufacture. The evaporation of the inflammable solvents has also introduced fire hazards of no mean magnitude, which are a source of considerable concern.

I have discovered that the disadvantages mentioned above are overcome and a brush of unusually high quality is produced at a low cost by bonding the bristles with an aqueous dispersion of rubber which preferably contains vulcanizing agents.

The rubber dispersions which are employed to bond the bristles together are preferably artificial dispersions, for the rubber contained in the artificial dispersions is more plastic than that contained in natural latex, and accommodates itself more readily to the spaces between the bristles. The dispersions may be prepared with a concentration of rubber or other non-volatile constituents as high as 75% while still retaining their fluidity, but somewhat lower concentrations are ordinarily preferred because of their lower viscosity and the consequent more ready impregnation of the mass of bristles.

The sulphur or other vulcanizing agents may be incorporated with the rubber prior to the dispersion and dispersed therewith, or may be separately dispersed and mixed with the dispersion of the rubber. Since it is preferred to make brushes with a hard rubber binder the quantity of sulphur should be at least a third of the quantity of rubber employed.

The butt ends of the bristles may be impregnated with the rubber dispersion either individually or in small groups, or in the knots which are to constitute the finished brushes. After the evaporation of the major portion of the water contained in the dispersion, the bristles are compressed into the form which they are to take in the finished brush, the rubber in and on the bristles amalgamating to bind them together into a solid unit.

The aqueous medium in which the rubber is dispersed does not always penetrate the mass of bristles very readily. Consequently, it is preferred to add to the dispersion a substance which will assist the impregnation of the bristles by increasing their affinity for the liquid of the dispersion. Such substances which facilitate the impregation of solids with liquids are generically termed "introfiers". Many of the introfiers appear to owe their effectiveness largely to their influence on the interfacial tension of the two substances in question (for example the bristles and the aqueous dispersion), facilitating the wetting of the solid by the liquid. Among the more common and most useful introfiers are the soaps, such as sodium or ammonium oleate, potassium stearate, triethanolamine oleate, and resin soaps; certain water-soluble sulphonated bodies such as the sodium salt of di-isobutyl naphthalene sulphonic acid; certain hydroscope organic substances such as glycerine and triethanolamine, etc. The amount added need not be large, a few tenths of a percent. frequently being sufficient, although larger proportions may be more effective. A mixture of two or more of the introfiers may often be employed to advantage.

*Example 1.*—A knot of bristles is inserted in a metal ferrule, the butt end of the bristles extending a considerable distance through the ferrule. The ends of the bristles are then dipped for about three-eights of an inch in an aqueous dispersion made by mixing 45 parts by weight of reclaimed grey inner tubes, 23 parts of plantation rubber, 24 parts of sulphur, 5 parts of stearic acid, and adding slowly during mastication a solution of three parts of triethanolamine oleate, finally diluting to 25% concentration with a weak ammonia solution and adding 1 part of the sodium salt of di-isobutyl naphthalene sulphonic acid. The water contained in the dispersion is allowed to evaporate and the brush is warmed to soften the plastic rubber on the bristles, which are then drawn into their final position in the ferrule. The rubber-coated bristles occupy more space than the uncoated bristles, hence the operation of drawing them into the ferrule subjects them to a considerable lateral compression and amalgamates the rubber binder on and around the bristles. The rubber is vulcanized by placing the brushes on a hot plate at about 300° F. for three hours, the bristles then being permanently united to one another and to the ferrule. A handle may be fastened in the ferrule in any desired manner.

*Example 2.*—A knot of bristles is positioned in a metal ferrule so that the bristles occupy about half the length of the ferrule. An aqueous dispersion containing 100 parts by weight of reclaimed rubber is mixed with aqueous dispersions containing 100 parts of sulphur, 10 parts zinc oxide, and 3 parts of a rapid organic accelerator, the mixture is diluted to about 20% concentration and mixed with a solution containing 4 parts of ammonium resinate. The reclaimed rubber may be dispersed in a manner similar to that described in Example 1 above, the reclaimed rubber being masticated with a small proportion of a fatty acid, and an alkaline solution of a peptizing agent being slowly added. The other substances may be dispersed by grinding the respective substances in a high speed colloid mill in the presence of a dilute alkaline solution of a protective colloid such as gelatine or casein.

A small quantity of the compounded latex is poured over the butt ends of the bristles in the ferrule and is allowed to penetrate between the bristles and dry. The rubber binder may then be vulcanized at a lower temperature or in a shorter time than the composition described in Example 1 above which does not contain an accelerator. For example, a good vulcanization is secured in only one hour at 300° F., the bristles being less affected by the heat than if vulcanization were continued for a longer time.

It is to be understood that the examples given above are merely illustrative and that aqueous dispersions containing rubber together with fillers, pigments, softeners, vulcanizing agents, etc. may be employed generally as binders in the process of this invention.

I claim:

1. The method of binding the bristles of a brush, which comprises impregnating the butt end of the bristles with an aqueous dispersion of rubber, and evaporating the water therefrom.

2. The method of binding the bristles of a brush, which comprises impregnating the butt end of the bristles with an aqueous dispersion of rubber in the presence of an introfier, and evaporating the water therefrom.

3. The method of binding the bristles of a brush, which comprises impregnating the butt end of the bristles with an aqueous dispersion of rubber, evaporating the water therefrom, and vulcanizing the rubber.

4. The method of manufacturing brushes which comprises impregnating the butt ends of the bristles with a vulcanizable aqueous dispersion comprising reclaimed rubber and a saponaceous introfier, evaporating the water therefrom, compacting the bristles, and vulcanizing the rubber to hard rubber.

5. The method of manufacturing brushes which comprises impregnating the butt ends of the bristles with an aqueous dispersion of rubber containing sulphur and a rapid accelerator of vulcanization, evaporating the water therefrom, and vulcanizing the rubber.

6. The method of manufacturing brushes which comprises impregnating the butt ends of the bristles with an aqueous dispersion comprising reclaimed rubber, sulphur, a rapid accelerator of vulcanization and an introfier, evaporating the water therefrom, compacting the bristles and vulcanizing the rubber to hard rubber.

7. The method of binding the bristles of a brush which comprises applying to the butt ends of the bristles a vulcanizable aqueous dispersion of rubber, evaporating water therefrom, compacting the bristles, and vulcanizing the rubber to hard rubber.

In witness whereof I have hereunto set my hand this 28th day of January, 1930.

WALDO L. SEMON.